Dec. 1, 1931.   F. H. ROGERS   1,834,870
VALVE
Filed Oct. 26, 1925   4 Sheets-Sheet 1

Inventor
Frank H. Rogers
By his Attorneys
Edwards, Sager & Bauer

Dec. 1, 1931. F. H. ROGERS 1,834,870
VALVE
Filed Oct. 26, 1925 4 Sheets-Sheet 2

Inventor
Frank H. Rogers
By his Attorneys
Edwards, Sager & Bower

Dec. 1, 1931.  F. H. ROGERS  1,834,870
VALVE
Filed Oct. 26, 1925   4 Sheets-Sheet 3

Inventor
Frank H. Rogers
By his Attorneys

Dec. 1, 1931.  F. H. ROGERS  1,834,870
VALVE
Filed Oct. 26, 1925  4 Sheets-Sheet 4

Inventor
Frank H. Rogers
By his Attorneys
Edwards, Sager & Bauer

Patented Dec. 1, 1931

1,834,870

UNITED STATES PATENT OFFICE

FRANK H. ROGERS, OF PHILADELPHIA, PENNSYLVANIA, ASSIGNOR, BY MESNE ASSIGNMENTS, TO I. P. MORRIS CORPORATION, A CORPORATION OF DELAWARE

VALVE

Application filed October 26, 1925. Serial No. 64,714.

This invention relates to valve mechanism and more particularly to means for sealing a movable valve member and its cooperating casing.

The specific type of valve herein disclosed is of the butterfly or pivotal type and the problems and difficulties relating to this type of valve are also present in other types of valves wherein it is desired to effect the sealing action between a movable valve member and a cooperating stationary member. The difficulties, however, are somewhat more accentuated in butterfly valves. There has been developed principally for hydraulic turbine work two principal forms of butterfly valves, the first being that of having the valve disc set at an angle to the center line of the pipe so that when the valve is closed the disc will seat as by a taper fit in the valve casing. This type of seat is only effective against the leakage at the two points where the disc is in contact with the body. For all other portions around the disc there is a clearance between the same and the body through which the water can leak. Also with this type of valve the tightest fit between the disc and the body occurs on the pressure side of the disc as at this point the water pressure attempts to force the disc into closer contact with the body while on the diametrically opposite side the water pressure tends to force the disc open or away from its contact with the body and hence a slight deflection of the disc occurs causing leakage at this point.

The other general type of valve to overcome leakage is one furnished with movable rings often known as snap rings which are usually inserted in the periphery of the valve disc. These rings move in a generally radial direction but this type of valve, like the angularly disposed valve above mentioned, very often becomes warped and as a result the snap rings do not make a true seat with the valve casing and hence leakage will occur. Another difficulty experienced with valves of the snap ring type is that sand or other foreign material will accumulate behind the rings and sometimes prevent radial movement thereof. This sometimes causes the valve to become stuck when in closed position, or may cause other difficulties in operation.

With the above and other problems in mind it is an object of my invention to provide means whereby an effective seal will be made irrespective of warping of the valve, or of any other conditions which might exist such as the valve not being truly circular. In one specific aspect of the invention such seal is effected by providing means such as might be termed a diaphragm and consisting generally in having a substantially continuous flexible member extending around the periphery of the valve disc and so arranged that it may flex along angularly disposed axes. Thus it will be seen that the flexible sealing member may conform to a cooperating irregular seating surface.

It is a further object of my invention to provide means whereby the sealing means may be controlled by fluid pressure and in one specific aspect of the invention the source of this fluid pressure is the fluid which is being controlled. A further object is to provide means whereby the diaphragm or sealing member may be pressed against its cooperating seat by a very substantial pressure. To accomplish this result in one specific manner advantage is taken of the fact that when the valve is in closed position differential pressures will exist on the up and down stream side of the valve.

A still further object of the invention is to provide semi-automatic means for pressing the flexible sealing member against its cooperating seat which means is operative after the valve disc is brought to its closed position. Specifically this mode of operation is attained by having one or a series of holes in the diaphragm member on the up stream side thereof. Due to the fact that the diaphragm member extends over each side of the valve disc water or other liquid on the up stream side entering the diaphragm member through the holes will create a pressure on the down stream side of the diaphragm and tend to bulge the same inwardly against the down stream side of the valve disc. My invention is not, of course, limited to this semi-automatic feature for the pressure within the diaphragm or sealing means can be controlled by any external mechanism. Another object of my invention is to provide means for automatically controlling the pressure within the sealing means in accordance with opening or closing of the valve disc or gate. In this aspect of the invention the same may embody the semi-automatic feature above referred to. The particular object of controlling the pressure within the sealing means is to allow the valve gate to be brought to and from its closed position without having any contact between the cooperating sealing parts and thereby reduce friction during movement of the valve or wear and tear between the relatively movable parts. Due to the use of flexible sealing means, it is particularly advantageous to release the same as above stated for the reason that if the valve disc during movement should have forcible contact with the flexible member the latter might tend to be pulled into an abnormal and unnecessary shape.

In the accompanying drawings illustrating the invention—

Figure 1:
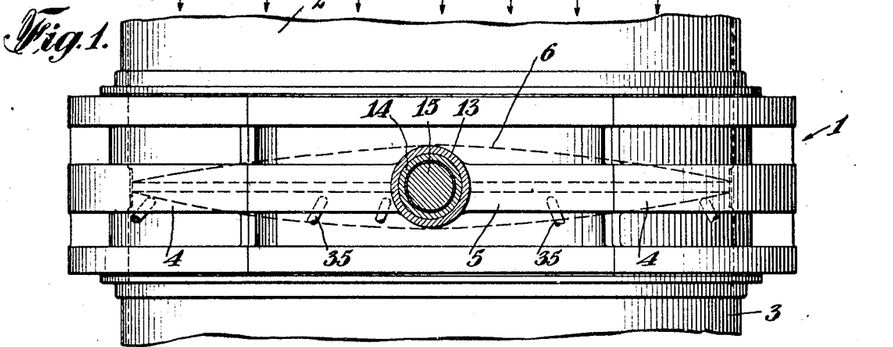
Fig. 1 is a plan view of the valve mechanism associated with the pipe line.
Figure 2:
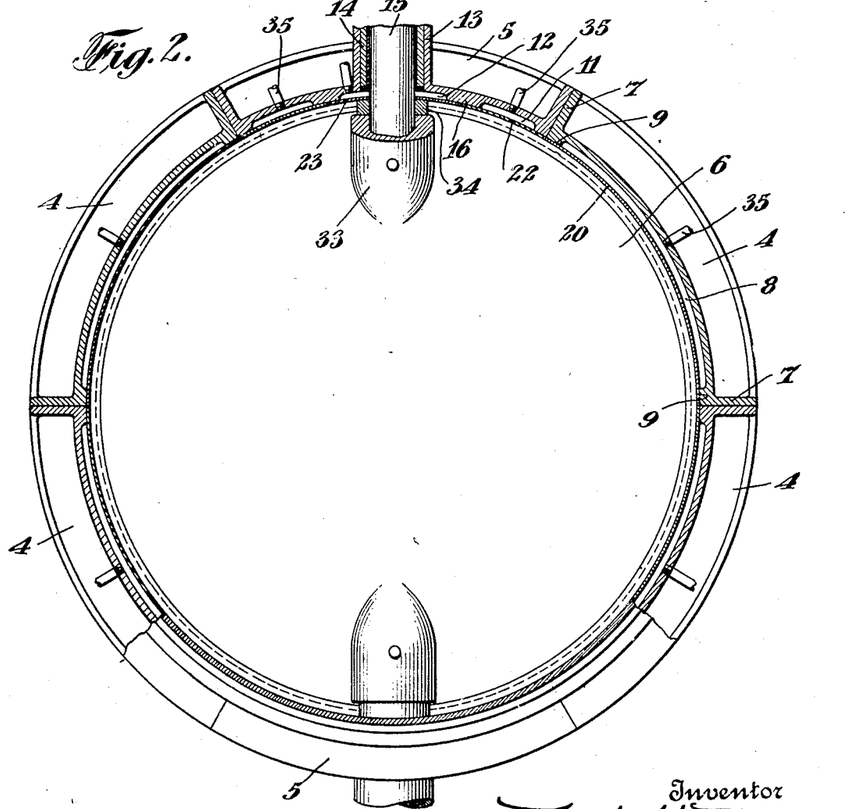
Fig. 2 is a vertical transverse sectional view of the valve casing adjacent the movable valve member.
Figure 4:
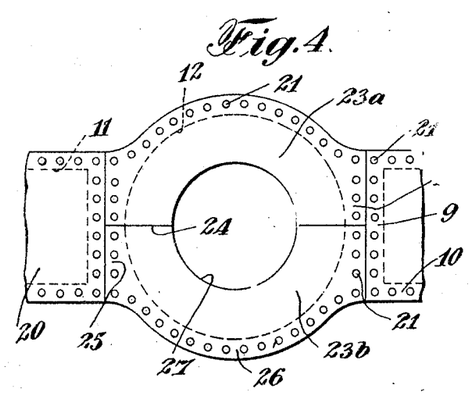
Fig. 4 is a plan view thereof.

In the illustrated embodiment of my invention I have shown a valve mechanism generally indicated by 1 interposed between an upstream pipe 2 and a downstream pipe 3, the latter being adapted for connection to a turbine or other suitable hydraulic apparatus. As shown in Fig. 2 the valve mechanism comprises a casing made up of a series of identical segments 4 and a pair of diametrically opposed identical segments 5. The segments 5 are somewhat different in construction from the segments 4 in order to permit pivotal support of the valve gate 6. The various segments are joined by radial flanges 7 which are held together in any suitable manner as may be desired. Each of the segments 4 on their inner sides are provided with a recess 8 surrounding which are, as shown in Figs. 2 and 4, axial and peripheral supporting surfaces 9 and 10 respectively. As shown in Figs. 2 and 4 the segments 5 are provided with substantially rectangular shaped recesses 11 and a central annular recess 12, a bearing 13 projecting upwardly from the segments 5 adjacent the recess 12. A suitable bushing 14 is disposed within the bearing housing 13 to receive a trunnion 15 which is secured to the gate valve 6. Recesses 11 and 12 are surrounded by supporting surfaces 16.

When the valve housing comprising the parts 4 and 5 is assembled the supporting surfaces 9, 10 and 16, Figs. 2 and 4, will provide a substantially cylindrical inner surface upon which a series of sealing members 20 may be mounted to form a diaphragm. These sealing members for the segments 5 are generally rectangular in shape and secured to the surfaces as by rivets, screws or other suitable means generally indicated 21 while the sealing members 22 for covering the recesses 11 are somewhat similar to the members 20. The sealing members by having one portion thereof secured to the casing or the valve disc while the remaining portion is flexible provides broadly a diaphragm having immovable and radially movable portions. The sealing members 23 for covering the recess 12 comprises as shown in Fig. 4 two members 23a and 23b placed in adjacent relation along a line 24 which is transverse to the longitudinal axis of the pipes. The members 23a and 23b are secured along their longitudinal edge 25 by rivets or screws 21 and are similarly secured along their transverse edge 26, while the adjacent edges along the line 24 are left relatively free. A circular opening 27 formed in the sealing member 23 receives and has a running fit with the shaft 15 of the gate 6. It will, of course, be understood that while these sealing members or plates are relatively thin so as to flex radially they are nevertheless sufficiently strong to resist wear and pressure to which they might be subjected.

Figure 7:
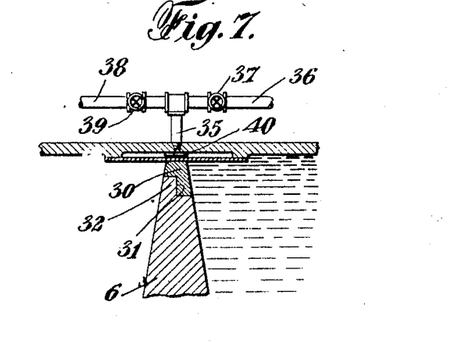
Fig. 7 is a sectional view showing one means for controlling fluid pressure to the sealing means.

The valve 6 as shown in Fig. 1 is disposable at right angles to the axis of the pipe line and its periphery as shown in Fig. 7 is provided with a removable seat ring 30 having an annular recess 31 within which an annular flange 32 formed on the periphery of the valve will be disposed. In order to machine the periphery of the gate valve the hub 33 will be cut below the flange 32. After the machining operation a sleeve 34 which surrounds the shaft 15 is placed upon the hub 33. The upper surface of the sleeve is curved so as to provide a sealing surface for cooperation with the plate 23.

To control movement of the various sealing plates pipes 35 have communication with each of the recesses 8, 11 and 12. These pipes as shown in Fig. 7 may have communication with the upstream side of the piping as by a pipe 36 which is controlled by any usual type of manually operable valve 37. A pipe 38 is also adapted to allow communication between the downstream side of the valve mechanism and the pipes 35, and pipe 38 also being provided with a manually operable valve 39. A suitable spacing member 40 may be disposed within each recess adjacent the sealing members to limit inward movement of the sealing plates.

In the operation of this form of the invention the valve disc 6 is assumed to have been moved transversely of the pipe line to closed position as indicated in Fig. 1. During this time the valves 37 and 39, Fig. 7, are opened and closed respectively. This permits water or other liquid on the upstream side to flow to the various recesses behind the sealing plates thereby equalizing the pressure on the upstream side of the plates while permitting a different pressure to exist on the downstream side of the plates. This differential pressure condition can exist due to the fact that when the valve 6 is brought to its closing position the downstream side of the pipe will be practically discharged leaving substantially atmospheric pressure therein. The result of this pressure condition is that the downstream side of the sealing plates adjacent the downstream peripheral edge of the valve 6 will be forced into contact therewith. Due to the flexibility of the sealing plates in different directions, for example, along both their transverse and longitudinal axes, irregularity can exist in the shape of the valve disc without effecting the sealing action of the plates. This irregularity may be due to several causes certain of which as above mentioned consist in warping of the disc or to conditions created during assembling thereof. Prior to movement of the valve 6 to its open position the valve 37 will be closed and the valve 39 opened, thus resulting in discharge of the fluid in the recesses and due to the pressure on the upstream side the sealing plates will be forced inwardly against the spacing or core members 40 and free of the peripheral edge of the seating ring 30. Thus the valve can be rotated relatively easy to its open position and without in any way subjecting the sealing plates to unnecessary wear, it being noted that the valve member when near closed position has its peripheral surface movable substantially parallel to the inner surface of the casing. These surfaces which are the nearest adjacent portions of the disc and casing are provided with ample clearance to facilitate unrestricted movement of the valve when unsealed. In this form of the device the securing of the adjacent ends of the sealing plates does not interfere with a substantially complete sealing action between the valve disc and its casing. The core member 40 extends as a fixed circumferential ridge within the pressure chamber which is formed by the flexible sealing member and surrounding casing, this ridge of course being broken at the points where pressure or bearing connections pass into or through the pressure chamber.

Figure 3:
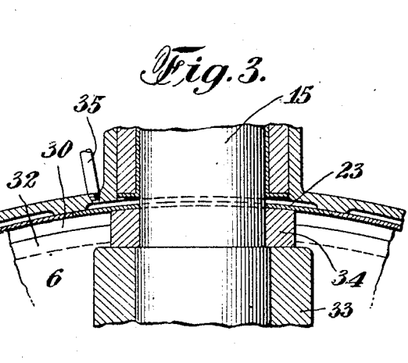
Fig. 3 is an enlarged detail view showing the flexible member surrounding the gate shaft.
Figure 5:
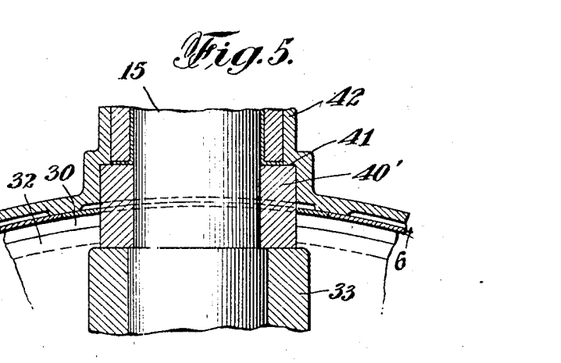
Fig. 5 is a sectional view similar to Fig. 3 of a modified form.
Figure 6:
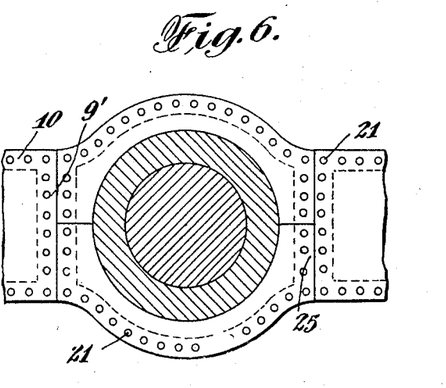
Fig. 6 is a plan view of Fig. 5.

In the modified form as shown in Figs. 5 and 6 a sleeve 40' similar to the sleeve 34 is seated upon the hub 33 and extends upwardly into a suitable recess 41 formed in the bearing housing 42, the shaft 15 being suitably journalled therein similar to that as shown in Fig. 3.

Figure 8:
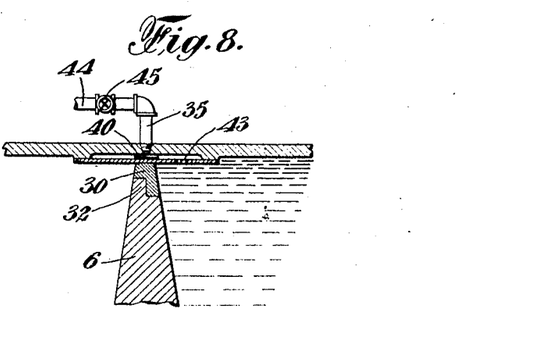
Fig. 8 is a modified form of controlling means and embodying a semi-automatic controlling feature.

In a further modified form of the sealing mechanism a semi-automatic control of the actuating fluid for the sealing members is effected. For instance in Fig. 8 the plates are provided on the upstream side with a small leak port 43 while the pipe 35 has connection with only a discharge pipe 44, a manually operable valve 45 being disposed within the pipe 44. In the operation of this form of control, when the valve 6 is brought to its closed position the downstream side of the pipe will be discharged while the water or other liquid in the upstream side will flow under pressure through the ports 43 and force the sealing plates into contact with the sealing ring 30 as explained in connection with the operation of the form shown in Fig. 7. To release the sealing plates the valve 45 will be opened and the pressure behind the sealing plates greatly reduced after which the pressure on the upstream side of the valve disc will force the sealing plates against the spacing members 40. While this released condition of the sealing plates exists water will flow through the port 43 but due to the discharge pipe 44 being open no pressure will accumulate behind the sealing plates. It will thus be seen that this form of the invention has means for controlling a portion of the sealing action automatically in accordance with the valve disc operation.

Figure 15:
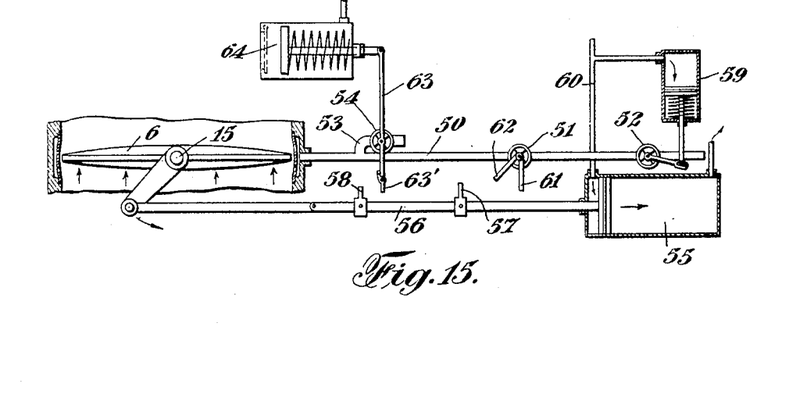
Figs. 15 to 17 are diagrammatic views of the various steps during automatic control of the fluid pressure for controlling the sealing means in accordance with the operation of the gate valve.
Figure 16:
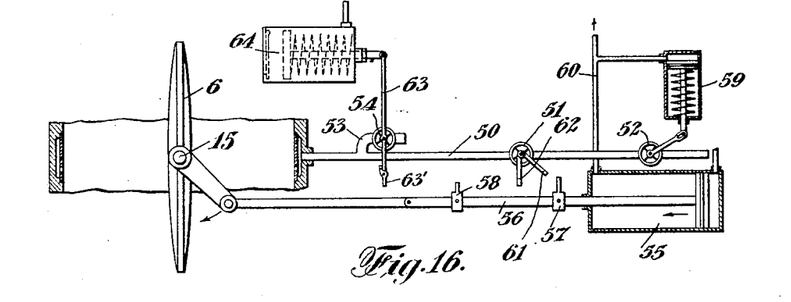
Figure 17:
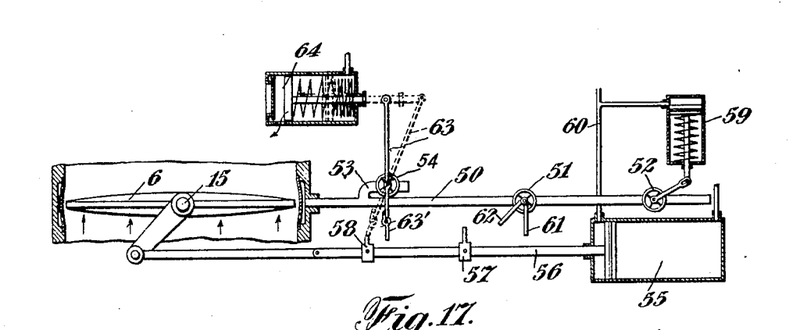

To render control of the sealing plates completely automatic there may be provided, as diagrammatically shown in Figs. 15 to 17, an atmospheric discharge pipe 50 communicating with each of the pipes 35 and provided with valves 51 and 52 and with a branch pipe 53 which has a valve 54. It will, of course, be understood that the valve disc 6 is operated by a suitable type of motor which is herein diagrammatically shown as of the fluid actuated piston type generally indicated by 55. A piston rod 56 which is connected to a crank arm mounted on the valve shaft 15 carries adjustable valve engaging members 57 and 58. The valve 52 may be operated by a diaphragm, or piston and cylinder mechanism 59, which is actuated by the fluid pressure supplied through a pipe 60 from the left cylinder end of motor 55. The valve 51 is provided with a forked arm having different length arms 61 and 62. The valve 54 has an arm 63 to which is attached a dash pot 64 or other suitable mechanism whereby after the valve 54 is moved in a clockwise direction to its open position the valve will be so held for a predetermined period of time. After this elapsed time the dash pot or equivalent mechanism will permit the return of the valve 54 to its closed position. The member 57 engages the arm 62 upon movement of the rod 56 from its extreme right hand position toward its left hand position. The member 58 by a suitable means, such as a yieldable latch member 63' carried on the lower end of the arm 63, is adapted to move by the valve 54 in a right-hand direction without actuating the valve. The arrangement shown would for practical purposes open the valve 52 prior to the actuation of the motor 55 for the pressure necessary to actuate the motor might be considerably greater than the pressure necessary for actuating the valve 52.

In the operation of this automatic form of my invention it will be assumed that the valve disc is in closed position and is sealed. During this condition valves 52 and 53 will be closed, valve 51 is open, and the piston of the motor 55 will be at its left hand position. Prior to opening of the valve disc it is desired to release the pressure behind the sealing plates. This is accomplished by admitting actuating fluid to the left hand end of the motor cylinder which fluid will also flow through the pipe 60 to the mechanism 59 to open the valve 52 as shown in Fig. 15 thereby venting the pipe 50 to the atmosphere to release the pressure on one side of the sealing plates. Due to the relatively small pressure necessary to actuate the valve 52 the latter will be opened as before stated prior to the time when the fluid pressure in the motor will be sufficient to actuate the same. Upon actuation of the motor the gate valve will be initially opened while the sealing plates are free of the gate disc. After the valve disc is moved away from the sealing plates, it is desirable to close the pipe 50 to prevent any discharge of water from the pipe line as through the ports 43. To effect this operation the member 57 is spaced a short distance from the arm 61 so as to allow sufficient movement of the valve disc prior to closing of the valve 51 by engagement of the arm 61 by the member 57. The closed position of valve 51 is shown in Fig. 16 wherein the motor piston has reached its right hand limit of movement. Actuating pressure thereto will be shut off and this will also release actuating pressure in the valve operating mechanism 59 thereby allowing the valve 52 to be closed as by a spring or other device. When it is desired to close the valve disc the motor will be actuated and when the valve disc has just about reached its closing position fluid pressure which has accumulated behind the sealing plates will be released. This is effected by the member 58 engaging the arm 63 as shown in Fig. 17 to open the valve 54 thereby venting the pipe 50 and accordingly allowing the pressure within the pipe line to force the sealing plates outwardly from the periphery of the valve disc. The latter can thereby come to its closed position without engaging the sealing plates. In order to prevent any sealing action until the valve disc is in its full closed position, the dash pot mechanism 64 will hold the valve 54 open a predetermined length of time as shown in dotted lines in Fig. 17. The valve 54 will thereafter be closed to the full line position in Fig. 17 by a suitable spring or other mechanism cooperating with the dash pot mechanism. Due to the valves 52 and 54 now being closed water under pressure will accumulate behind the sealing plates as by flowing through the ports 43 to cause a sealing action as before described. The valves 51, 52 and 53 and the motor will now be in the position initially assumed.

Figure 9:
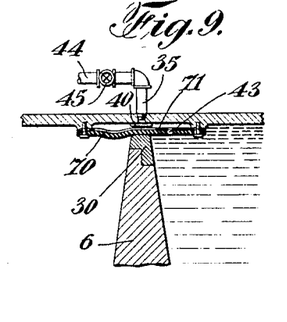
Fig. 9 is a sectional view showing the sealing member in its sealing position.
Figure 10:
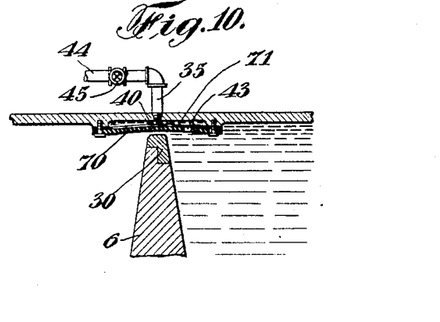
Fig. 10 is a sectional view showing the sealing member in released position.

A further modification of the sealing means is shown in Fig. 9 wherein a sealing member 70 is made of rubber or other well-known non-metallic flexible material. In order to assist movement of such material or to help keep the shape thereof a small flexible metallic backing plate 71 may be provided. A leak port 43 could, of course, be used in this construction as could also any of the other various types of mechanism for controlling the fluid behind the sealing member. Figs. 9 and 10 clearly show the sealing member in its sealing and released positions respectively. The sealing ring 30 could be made of any suitable material also, such as rubber for it has been found that cooperating rubber surfaces when lubricated by water form a very efficient combination. As is illustrated in Fig. 9 the sealing member is flexed on the downstream side more than on the upstream side due to the difference in pressure on the downstream side of the valve disc.

Figures 11, 14:
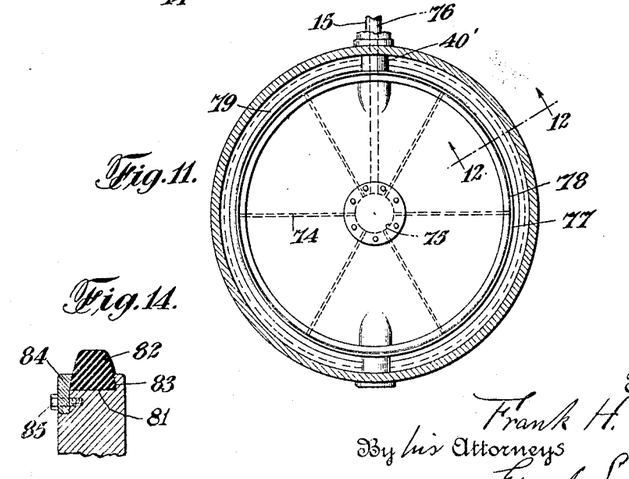
Fig. 11 is a transverse sectional view showing a modified form of sealing means.
Fig. 14 is a modified view of a removable seat ring.
Figure 12:
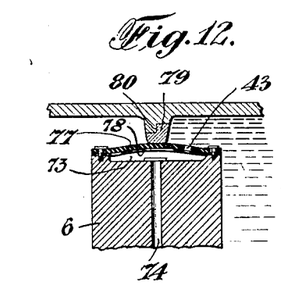
Fig. 12 is an enlarged detail sectional view of the modified form of sealing means shown in Fig. 11.
Figure 13:
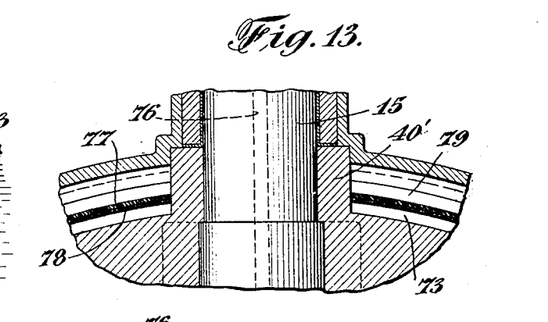
Fig. 13 is an enlarged view showing the modified form of sealing means in Fig. 11 adjacent the valve shaft.

Another modified form of my device is shown in Figs. 11 to 13 wherein the yieldable sealing means is carried by the periphery of the valve disc. The valve 6 is provided with a peripheral groove 73 which has communication as by a series of radial passages 74 with a central chamber 75 which in turn has communication as through a radial passage 76 extending out through the shaft 15 with any of the above described types of mechanism for controlling fluid behind the sealing member. A flexible member 77 covers the annular recess 73 and has also a leak port 43. A suitable backing plate 78 may be provided. The seating ring 79 is mounted on the stationary valve housing and is in all respects similar to the ring 30 except, of course, that the annular recess 80 corresponding to the recess 31 is on the outer side. As shown in Fig. 13 the sealing member 77 extends around the sleeve 40'. This resilient means easily presents a continuous sealing surface around the valve disc periphery between the pivot shafts thereof. The resilient means in general, which would include either the metallic or non-metallic type, constitutes a diaphragm-like member, this being in distinction to snap-rings, segments thereof, or the like.

A modified form of sealing ring for the valve disk is shown in Fig. 14 wherein a peripheral annular recess 81 receives a sealing ring 82. The ring has inclined sides engaging an inclined surface 83 of the recess 81 and a clamping ring 84 which is secured to the valve disc as by a series of cap screws 85.

By the use of the leak port 43 the possibility of accumulation of sand or grit behind the sealing plates is reduced to a minimum. This for the reason that water flows through the port 43 and out the other side thereby causing a circulation of water in one direction. This circulation will carry any sand out the discharge side. In other forms where the port is not used suitable drain valves could be furnished.

While several forms of the invention have been specifically described, it will of course be understood by those skilled in the art that various changes may be made in the details and arrangement of parts without departing from the spirit of the invention as set forth in the appended claims.

I claim:—

1. A valve mechanism comprising a casing member, a pivoted valve disc member, and means for sealing said members when in their closed relation, including a radially flexible element adapted to be flexed by fluid pressure and means for supporting said element, whereby a transverse section of said element has a portion which is relatively immovable during flexure of another portion of said section by fluid pressure.

2. A valve mechanism comprising a casing member, a pivoted valve disc member, and means for sealing said members when in their closed relation, including a radially flexible element adapted to be flexed by fluid pressure, means for supporting said element, whereby a transverse section of said element has a portion which is relatively immovable during flexure of another portion of said section by fluid pressure, one of said members having a recess formed therein for receiving fluid pressure to effect flexure of said sealing element, and said flexible member being adapted to flex inwardly and outwardly with respect to said recess in accordance with sealing or unsealing operations.

3. A valve mechanism comprising a casing, a pivotal valve member disposed therein, and means for sealing said member and casing including a member having relatively movable and immovable portions, and means whereby said member is adapted to have one side thereof uniformly subjected to the same pressure while the other side thereof is subjected to different pressures.

4. A valve mechanism comprising a casing, a movable valve member disposed therein, and means for sealing said member and casing including a diaphragm having immovable and radially movable portions, said diaphragm being adapted to be subjected to fluid pressure from opposite sides of and having provision for releasing the pressure from one of said sides.

5. A valve mechanism comprising a casing and a movable valve member disposed therein, means for sealing said member and casing including a member having relatively movable and immovable portions, and means whereby the movable portion of said sealing means is adapted to be moved to its sealing condition only after said valve member is brought to its normal closed position.

6. A valve mechanism comprising a casing, a movable valve member disposed therein, means for sealing said member and casing including a member having immovable and radially movable portions, and means for effecting radial movement of said sealing means to a non-sealing position prior to opening of said valve member.

7. A valve mechanism comprising a casing, a pivotal valve member disposed therein, means for sealing said member and casing including a flexible diaphragm like member having a substantially continuous inner wall, and means for effecting movement of said sealing means to its sealing position when said valve member is in its closed position and for effecting movement of said sealing means to a non-sealing position prior to movement of said valve member from its closed position.

8. A valve mechanism comprising a casing, a movable valve member disposed therein, means for sealing said member and casing including radially flexible means forming a chamber, said flexible means having in a transverse section thereof relatively movable portions, and a restricted port for allowing flow of fluid from the casing to said chamber, and means for allowing discharge of fluid from said chamber.

9. A valve mechanism comprising a casing, a movable valve member disposed therein, means for sealing said member and casing including radially flexible diaphragmatic means forming a chamber and a restricted port for allowing flow of fluid from the casing to said chamber, and means for allowing discharge of fluid from said chamber while fluid continues to flow into said chamber through said restricted port.

10. A valve mechanism comprising a casing having an outlet and a valve member movable transversely of the outlet side of said casing, said casing and valve member when near closed position having adjacent surfaces relatively movable in substantially parallel relation, and means for sealing said member and casing including a member adapted to flex in angularly disposed directions and to assume a non-sealing position to provide clearance between said valve member and said sealing means when the valve is in closed position, and means for effecting sealing action only by fluid pressure and to release said fluid pressure to effect said clearance space.

11. A valve mechanism comprising a casing, a pivoted valve disc disposed therein, and means for sealing said disc and casing adjacent the periphery of said disc, including a flexible member supported by said casing and adapted to substantially conform to an irregular sealing surface, which irregularities may extend in angularly disposed directions, and means for effecting flexure of said member directly by fluid pressure.

12. A valve mechanism comprising a casing, a movable valve member disposed therein, and means for sealing said member and casing including a radially flexible diaphragm-like mechanism having normally relatively movable and immovable portions lying in the same transverse plane, said diaphragm being disposed between the nearest adjacent portions of said casing and valve member when the latter is in its closed position, and means for effecting expansion of said diaphragm by fluid pressure.

13. A valve mechanism comprising a casing having up and downstream sides, a pivoted valve member disposed therein and means for sealing said member and casing including a member adapted to be subjected to a greater sealing force on the downstream side than on the upstream side of the valve member.

14. A valve mechanism comprising a casing having up and downstream sides, a valve member disposed therein and movable when near its closed position in a direction substantially parallel to said casing, and means for sealing said casing and member including a flexible member adapted to be flexed a greater amount on the downstream side of said valve member when the latter is in its closed position than on the upstream side of said flexible member.

15. A valve mechanism comprising a casing having recesses to receive fluid pressure, and a pivotal circular valve disposed within said casing and having its periphery disposed adjacent to said recesses when in closed position, flexible plates secured to said casing and covering said recesses, and means for controlling the fluid pressure in said recesses, thereby to control sealing contact between said plates and the periphery of said valve member.

16. A valve mechanism comprising a casing, a substantially circular valve member pivotally mounted in said casing, and means for sealing said casing and valve member including flexible means extending around the pivots of said valve member at substantially right angles to the pivot axis.

17. A valve mechanism comprising a casing including a plurality of sections each provided with a recess, supporting surfaces surrounding said recesses, flexible plates secured to said surfaces to close each of said recesses, a substantially circular valve member disposed within said casing, pivots for supporting said valve member, bearings carried by certain of said casing sections for supporting said pivots, and sealing means surrounding said pivots comprising a pair of flexible members having free edges meeting along a line radially of the pivot axis.

18. A valve comprising a stationary casing, a pivoted valve member disposed therein and slightly spaced therefrom when in closed position to provide a clearance space, flexible sealing means carried by said stationary casing, and means for effecting actuation of said sealing means by fluid pressure, said sealing means being adapted to close the clearance space between said casing and said valve member when in closed position.

19. A valve comprising a stationary casing, a pivoted valve member disposed therein and slightly spaced therefrom when in closed position to provide a clearance space and a flexible diaphragm of generally cylindrical form supported by said casing and adapted to be moved by fluid pressure to close the clearance space between said casing and said valve member when in closed position.

20. A valve mechanism comprising a casing, a movable valve member disposed therein, a flexible contact sealing element for sealing said member and casing, and means for effecting movement of said sealing means by fluid pressure, including means for releasing said pressure automatically in accordance with an opening operation preparatory to opening movement of the valve.

21. A valve mechanism comprising a casing, a movable member disposed therein, means for sealing said member and casing, and means for effecting movement of said sealing means by fluid pressure, including means for releasing said pressure automatically in accordance with an opening operation preparatory to final closing movement of the valve.

22. A valve mechanism comprising a casing, a movable valve member disposed therein, power operated means for moving said valve, means for sealing said valve and casing, including a fluid actuated sealing member, and means for automatically controlling the sealing pressure in accordance with the power supply to said valve actuating means.

23. A valve mechanism comprising a casing having a pivotal valve member, pivot shafts upon which said member is supported, diaphragmatic means for sealing said casing and valve member, and means forming a recess around one of said pivot shafts, and a sleeve attached to said movable valve, surrounding said shaft and extending into said recess, with which said sleeve has a close fit.

24. A valve comprising a generally cylindrical body forming an outer stationary wall, a pivotal disc within said wall adapted to be rotated to a position normal to the axis of said cylindrical body, and a member forming a relatively narrow circumferentially disposed portion of said stationary wall, said member being composed of flexible material and being adapted to remain in substantially fixed position along its circumferentially disposed edge portions while its intermediate portion between said edge portions is adapted to be deflected radially inward so as to engage the edge of said disc when in closed position, and means to effect said deflection by fluid pressure and to relieve said deflection by a reduction of the fluid pressure to effect withdrawal of said flexible member from engagement with said disc during movement of the disc.

25. A valve comprising a stationary casing, a pivoted valve disc disposed therein, and a sealing member which extends circumferentially around the valve disc when said disc is in closed position, said sealing member forming on at least one side thereof a permanently closed contact with the casing, while the portion of said sealing member adjacent the edge of the valve disc is adapted to be flexed radially inward by fluid pressure to engage said disc, and means whereby the fluid pressure may be released to permit disengagement of said sealing member prior to opening of said valve.

26. A valve mechanism comprising a casing member, a valve disc member pivotally disposed therein, and means forming a positive fluid-tight chamber extending around the periphery of said disc and a portion of the means forming said chamber being adapted to be radially flexed by fluid pressure within said chamber, thereby to effect sealing action, another portion of said means, integral with said flexible portion, being relatively immovable during said flexure.

27. A valve mechanism comprising a casing member, a valve disc member pivotally disposed therein, and means forming a positive fluid-tight chamber extending around the periphery of said disc and a portion of the means forming said chamber being relatively immovable while another portion integral therewith is adapted to be radially flexed by fluid pressure within said chamber, thereby to effect sealing action, and means disposed within said fluid receiving chamber to positively limit movement of said flexible portion into said recess when pressure within said chamber is reduced.

28. A valve mechanism comprising a casing member, a valve disc member pivotally supported therein, and means for sealing and unsealing said members when in their closed relation, including a part adapted to be radially flexed to a sealing position by fluid pressure and to resume a substantially unflexed state when fluid pressure is released to provide clearance between said valve disc and said flexible sealing member, means for controlling the sealing fluid pressure so as to obtain said clearance with the valve in closed position or to close said clearance, said flexible part constituting a portion of a continuous wall forming a chamber for receiving the fluid pressure, and means forming a core disposed within said chamber, whereby movement of said flexible wall inwardly of said chamber is positively limited.

29. A valve comprising a stationary casing, a pivoted valve member disposed therein and slightly spaced therefrom when in closed position to provide a clearance space, flexible sealing means carried by said stationary casing, and means for effecting actuation of said sealing means by fluid pressure, said sealing means being adapted to close the clearance space between said casing and said valve member when in closed position, and flexible sealing means extending around the pivotal axis of said valve member.

30. A valve comprising a stationary casing, a pivoted valve member disposed therein, flexible sealing means carried by said stationary casing, and means for effecting actuation of said sealing means by fluid pressure, including a recess extending around the pivoted valve member, and said recess being closed by said flexible sealing means which is adapted to be radially flexed by fluid pressure in said recess to effect a sealing action between said casing and valve member.

31. In combination with a valve mechanism having a casing member and a movable pivoted valve member disposed therein, of means for sealing said members when in their relatively closed position, including means, forming a fluid pressure chamber, having a fluid operated flexible sealing member which has relatively movable and immovable portions, means for controlling the fluid sealing pressure whereby with the valve in closed position said flexible member is adapted to be either in a sealing position or in an unsealing position to provide clearance with said valve member, said sealing member being relatively wide in proportion to its thickness, when in an unflexed state, and whereby, during flexure thereof, the material of said sealing member will not be overstressed by undue distortion.

32. In combination with a valve mechanism having a casing member and a movable valve disc member disposed therein, of means for sealing said members when in their relatively closed position including means forming a fluid pressure chamber, having a fluid operated flexible member which has relatively movable and immovable portions, means for controlling the fluid sealing pressure whereby with the valve in closed position said flexible member is adapted to be either in a sealing position or in an unsealing position to provide clearance with said valve member, said flexible member when the valve member is in a closed position being disposed between the edge of said valve disc and a rigid backing element so as to limit the extent of its possible movement of flexure both inwardly and outwardly.

33. A valve mechanism comprising a casing, a movable valve member adapted to cooperate therewith and being spaced therefrom when in closed position to provide a clearance space, and means for sealing said member and casing including a sealing member adapted to be flexed along angularly disposed lines, and means for effecting operation of said sealing member only by fluid pressure to close said clearance space.

34. The combination in a valve mechanism comprising a casing member, a pivoted valve disk member therein, means forming a fluid pressure chamber in one of said members, said means including a flexible rubber portion forming at least a part of said chamber and being rigid with the remaining portion which forms said chamber, and means for admitting fluid pressure to said chamber to move said rubber portion radially into sealing position and to release said sealing pressure whereby said rubber sealing portion retracts to an unsealing position to provide clearance between the casing member and valve disc member when the valve is in closed position, said rubber portion being disposed between the peripheral portion of said disk and said casing when the valve is in closed position.

FRANK H. ROGERS.

CERTIFICATE OF CORRECTION.

Patent No. 1,834,870. Granted December 1, 1931, to

FRANK H. ROGERS.

It is hereby certified that error appears in the printed specification of the above numbered patent requiring correction as follows: Page 5, line 91, claim 4, for the word "of" read thereof; and that the said Letters Patent should be read with this correction therein that the same may conform to the record of the case in the Patent Office.

Signed and sealed this 1st day of March, A. D. 1932.

(Seal)

M. J. Moore,
Acting Commissioner of Patents.